United States Patent
Masi (10) Patent No.: US 12,193,411 B1
(45) Date of Patent: Jan. 14, 2025

(54) LEASH-POLE SYSTEM

(71) Applicant: Douglas J. Masi, Goodyear, AZ (US)

(72) Inventor: Douglas J. Masi, Goodyear, AZ (US)

(73) Assignee: D AND M ASSET MANAGEMENT, LLC, Goodyear, AZ (US)

( * ) Notice: Subject to any disclaimer, the term of this patent is extended or adjusted under 35 U.S.C. 154(b) by 3 days.

(21) Appl. No.: 18/144,272

(22) Filed: May 8, 2023

Related U.S. Application Data (60) Provisional application No. 63/340,395, filed on May 10, 2022.

(51) Int. Cl.
*A01K 27/00* (2006.01)

(52) U.S. Cl.
CPC ................. *A01K 27/003* (2013.01)

(58) Field of Classification Search
CPC ........................... A01K 27/003
See application file for complete search history.

(56) References Cited

U.S. PATENT DOCUMENTS

| | | | | |
|---|---|---|---|---|
| 1,331,633 A | * | 2/1920 | Fetters ................. | A01K 27/003 119/799 |
| 3,244,149 A | * | 4/1966 | Bosko .................. | A01K 27/005 D30/154 |
| 3,376,855 A | | 4/1968 | Mescher | |
| 3,964,441 A | * | 6/1976 | Wall ..................... | A01K 27/004 119/796 |
| 4,146,260 A | * | 3/1979 | Carrington ........... | A01K 23/005 294/1.5 |
| 4,182,272 A | * | 1/1980 | Taff ....................... | A01K 15/02 119/905 |
| 4,499,855 A | * | 2/1985 | Galkiewicz .......... | A01K 15/025 119/708 |
| 5,740,764 A | | 4/1998 | Jacobsen | |
| 6,053,129 A | * | 4/2000 | Akre .................... | A01K 27/005 119/799 |
| 7,926,452 B1 | | 4/2011 | Kim | |
| 8,307,789 B2 | | 11/2012 | Stuerke | |
| 8,413,613 B1 | * | 4/2013 | Smith .................... | A01K 27/00 119/797 |
| 8,720,385 B2 | | 5/2014 | Tanner | |
| 10,370,809 B1 | * | 8/2019 | Samen .................. | A01K 27/006 |
| 10,548,297 B2 | * | 2/2020 | Weatherly ............. | E01H 1/1206 |
| 2003/0183176 A1 | * | 10/2003 | Morrison ............. | A01K 27/004 119/796 |
| 2007/0039563 A1 | * | 2/2007 | Keller .................. | A01K 27/003 119/799 |
| 2008/0276883 A1 | * | 11/2008 | Perez Tomas ....... | A01K 27/004 294/1.3 |
| 2009/0261604 A1 | * | 10/2009 | Rodriguez ........... | A01K 27/008 119/796 |
| 2012/0312252 A1 | * | 12/2012 | Lipke ................... | A01K 27/004 119/796 |

(Continued)

*Primary Examiner* — Monica L Perry
*Assistant Examiner* — Brittany A Lowery
(74) *Attorney, Agent, or Firm* — Invention To Patent Services; Alex Hobson (57) ABSTRACT

A leash-pole system includes a leash-pole, an eyelet latch having a latch leash guide, a leash attachment, and a leash. The leash may be coupled to the leash-pole by the leash attachment. The leash may extend from an owner end, through the hand of a user/owner, along the leash-pole, through the latch leash guide, and to a pet end, where the leash may be coupled to a collar of a pet.

8 Claims, 6 Drawing Sheets

(56) References Cited

U.S. PATENT DOCUMENTS

| | | | |
|---|---|---|---|
| 2013/0087105 A1* | 4/2013 | Cuthbertson | A01K 27/005 70/58 |
| 2013/0133593 A1* | 5/2013 | Church | A01K 27/003 119/799 |
| 2013/0152869 A1* | 6/2013 | Morton | A01K 27/003 119/665 |
| 2017/0367302 A1* | 12/2017 | Caudill | A01K 15/02 |
| 2023/0225292 A1* | 7/2023 | Markham | A01K 27/003 119/769 |

* cited by examiner

LEASH-POLE SYSTEM

CROSS REFERENCE TO RELATED APPLICATIONS

This application claims the benefit of U.S. provisional patent application No. 63/340,395, filed on May 10, 2022; the entirety is hereby incorporated by reference herein.

BACKGROUND OF THE INVENTION

Field of the Invention

The invention relates to a leash-pole system used by owners of pets. A leash-pole system may be used by an owner to control, discipline, and protect their pet.

Background

Many leash systems exist that provide a leash and leash retractor. These systems present the drawback of having a single function, which is to keep a pet from running away. Simple leash and leash retractor systems do not allow owners to accurately control, disciple, or protect their pet.

SUMMARY OF THE INVENTION

The invention is directed to a leash-pole system including a leash-pole, a leash attachment, a leash, and an eyelet latch having a latch leash guide. The leash may be coupled to the leash-pole by the leash attachment. The leash may extend from an owner end, through the hand of a user or owner, along the leash-pole, through the latch leash guide, and to a pet end, where the leash may be coupled to a collar. The collar may be coupled to a pet.

The leash-pole may have a user end and an extended end. A leash attachment portion may be configured at the user end. The leash may be attached to the leash attachment portion of the leash-pole by the leash attachment. The leash attachment may be a flexible band or elastic band that wraps around the leash pole and the leash attachment portion, such as a protrusion from the leash pole, to attach the leash or leash retractor to the leash attachment portion. The leash attachment may form a first loop and a second loop when wrapped around a portion of the leash pole or configured through a handle of the leash retractor and these two loops may be configured around the leash attachment portion of the leash-pole to couple the leash or leash retractor to the leash-pole.

The leash may be housed within a leash retractor and may retractably extend from the leash retractor. A leash release lock may be configured on the leash retractor to toggle from a leach lock position to leash release position that allows the leash to further extend from or retract into the leash retractor. In embodiments that comprise a leash retractor, the leash retractor may be attached to the leash attachment portion by the leash attachment extending through a handle of the leash retractor.

The lease attachment may be a flexible band or an elastic band. The elastic band may be stretched to about 100% or more of its original length when subjected to a force, and the return to its original length when the force is removed. The elastic band may further be stretched to about 200% or more of its original length when subjected to a force, and then return to its original length when the force is removed. The flexible or elastic band may extend through a leash aperture of the leash, such as a leash retractor to form a first loop and a second loop around the leash attachment portion of the leash-pole, thereby attaching the leash to the leash-pole.

The leash-pole may further have a handle configured proximal to the user end which a user/owner may grip when using the leash-pole system. A portion of the handle may be a soft and elastic material that deforms when gripped by the user/owner and returns to its original shape when the user/owner releases their grip. In this manner, the handle may be more comfortable for the user/owner to grip and may allow the user/owner to grip the handle more securely.

A flexible extension may extend a length from the handle to the extended end of the leash-pole. The flexible extension may be tapered such that it tapers from the user end to the extended end. The length of the flexible extension may be about 0.5 m or more, about 0.75 m or more, about 1.0 m or more, about 0.75 m or less, about 1.m or less about 1.5 meters or less, or any range between and including the length values provided. A longer flexible extension allows the user/owner to extend the leash-pole to greater distances, and a shorter flexible extension allows the user/owner to have more control over the leash-pole. Furthermore, the flexible extension may be retractable, wherein a first segments, more proximal to the extended end, is configured to slide into a second portion, more proximal to the user end, or handle.

The flexible extension may be made substantially of graphite, meaning that the flexible extension may be made of at least 80% graphite by mass. The graphite of the flexible extension may be flexible graphite, which is created by submerging flake graphite into chromatic acid and/or sulfuric acid, and then exposing the flake graphite to heat. Flexible graphite allows the flexible extension to have elastic properties so that the flexible extension can bend and then return to its original shape.

The flexible extension may be plastically deformable, wherein it can bend to a radius of curvature from a load applied and then rebound back to an original orientation when the load is removed. The flexible extension can be bent to a radius of curvature without breaking, such as about 0.5 m or less, about 0.33 m or less, about 0.25 m or less, about 0.15 m or less and any range between and including the radius of curvature values provided. The bend of the flexible extension along a radius of curvature may be along the entire length or along a portion proximal to the leash attachment, such as from the extended end. Alternatively, only a portion of the flexible extension may form the radius of curvature, such as a portion extend from the extended end. Alternatively, various portions of the flexible extension may form different curvature radii when the flexible extension bends. The flexible extension may bend as a result of the pet pulling on the leash, which in turn creates a force on the eyelet latch, which creates a force on the flexible extension.

One or more pole leash guides may be configured along the flexible extension of the leash pole. A pole leash guide may include an eyelet for coupling the leash thereto. The pole leash guide may comprise an eyelet latch swivel that enables the leash to swivel or rotate orthogonal to the flexible extension of the leash pole axis and may also include a pole swivel configured to enable the pole leash guide to rotate about the flexible extension of the leash pole. These two portions of the pole leash guide enable orthogonal rotation of the leash with respect to the leash pole.

The leash may be coupled to the pole leash guide by an eyelet latch that may be detachably attachable to the eyelet of the pole leash guide. The eyelet latch may have a first eyelet latch arm that extends from a first eyelet latch hinge. The first eyelet latch hinge may allow the first latch arm to rotate to open and allow insertion of the leash or eyelet into the eyelet retainer. The first latch arm may then rotate back to a closed position to form a closed eyelet retainer. An eyelet latch may further have a second eyelet latch arm that extends opposite the first eyelet latch arm from a second eyelet latch hinge to open and close a second eyelet retainer. The second hinge may allow the second eyelet latch arm to rotate to open for insertion of the leash or eyelet. The second latch arm may then rotate closed to secure the eyelet latch in a closed position to form a closed second eyelet retainer. The leash may slide through one of the eyelet retainers and the other eyelet retainer may be configured around the eyelet of the pole leash guide to couple the leash to the leash pole or flexible extension of the leash pole.

An attachment accessory may be configured at the extended end of the leash-pole and may be an enlarged attachment on the extended end of the flexible extension, such as an end plug. An attachment accessory may be wider in dimension than a width or diameter of the extended end of the flexible extension by a factor of at least three or more, five or more, ten or more or any range between and including the values provided. The attachment accessory may have a diameter of about 20 mm or more, about 25 mm or more, about 35 mm or more, about 50 mm or more or any range between and including the values provided. The attachment accessory may be made of a resilient material such as silicone or another elastomer. The resilient material of the end plug may allow the end plug to deform when subjected to a force, and then return to its original shape when the force is removed. The user/owner may use the attachment accessory to touch the pet in order to guide the pet in a particular direction. The user/owner may further use the end plug to touch other animals in order to direct other animals away from the pet and the user/owner. The user/owner may further user the attachment accessory to push away unwanted items such as feces of the pet or of other animals. The user/owner may further user the attachment accessory to push away unwanted items such as objects that are harmful to the pet if swallowed by the pet.

The attachment accessory may be detachably attachable to the extended end of the leash pole to enable interchanging of the attachment accessory from one to another. An attachment accessory may include a pet toy, such as a ball, or a string and the like. An attachment accessory may be a pooper-scooper having an attachment feature, such as threads to detachably attach the pooper-scooper to the end attachment feature, such as threads. The pooper-scooper may enable a pet owner to conveniently pick up feces and place it in trash can. The attachment accessory may also be a retainer for poop-bags and this retainer or receptacle may be configured with the pooper-scooper, thereby providing options for the pet owner for picking up and disposing of pet feces.

A light may also be configured with the attachment accessory to provide light in low light conditions. In some embodiments, the light may be configured within the attachment accessory. Batteries may be configured within the attachment accessory or in the user end of the leash-pole to power the light. The batteries and light may form part of an electrical circuit that may be housed within the leash-pole.

A user may grip the leash-pole in a forward position by configuring the user's hand around the handle of the leash-pole such that the user's hand is configured closer to the extended end of the leash-pole than the front support. In the forward position, the user may have more control over the extended end of the leash pole. A user may alternatively grip the leash-pole in a rear position by configuring the user's hand around the leash attachment portion of the leash pole such that the user's hand is configured closer to the extended end than the rear support, but closer to the user end than the front support. In the rear position, the user may extend the leash-pole further from their body than in the forward position.

A strap may extend from the user end of the leash-pole. The strap may form a wrist or shoulder strap loop at the end of the r strap. The strap loop may be configured around an appendage or a portion of an appendage of the user, such as the user's wrist, shoulder, or elbow. The strap loop may alternatively be configured around another body part of the user such as the user's chest. Configuring the strap loop around a body part of the user may prevent the pet from pulling the leash-pole out of the user's grip and running away with the leash-pole.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be an included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
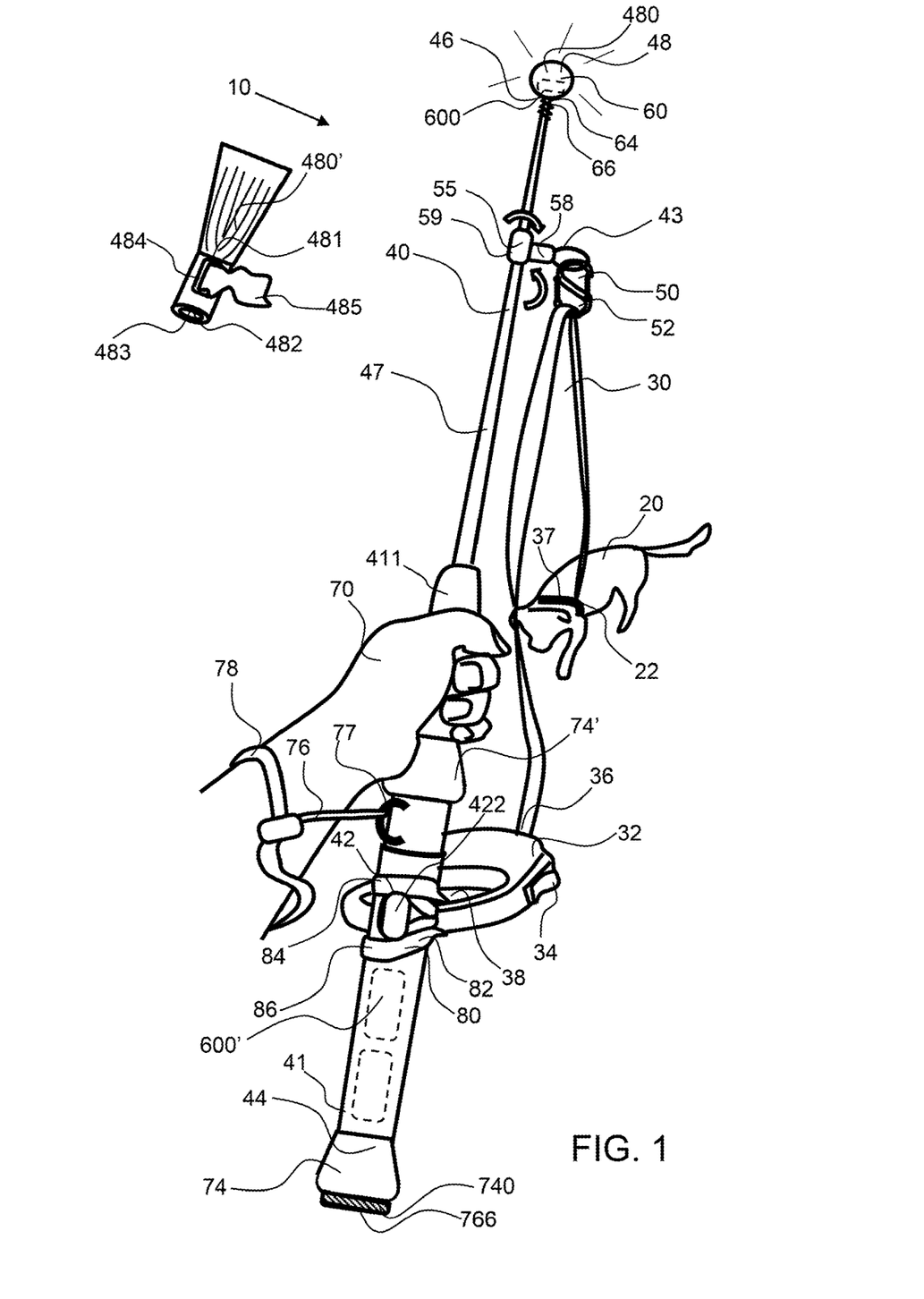
FIG. 1 shows a perspective view of a leash-pole system.
Figure 2:
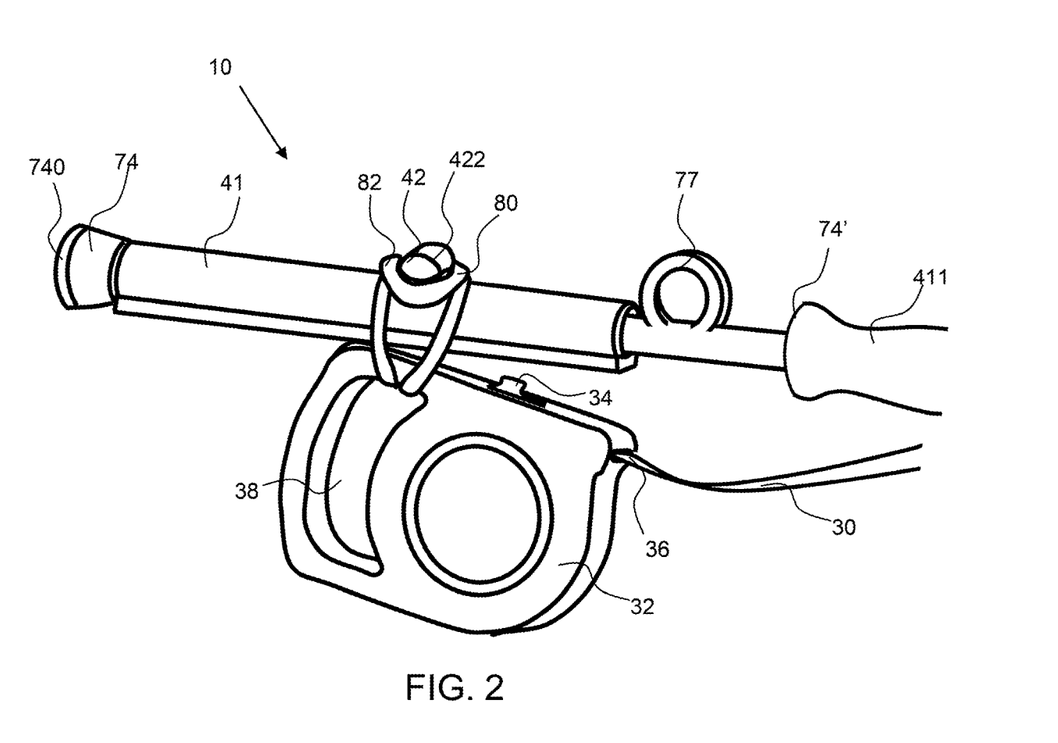
FIG. 2 shows a partial side view of a leash retractor and leash attachment portion of a leash-pole system.
Figure 3:
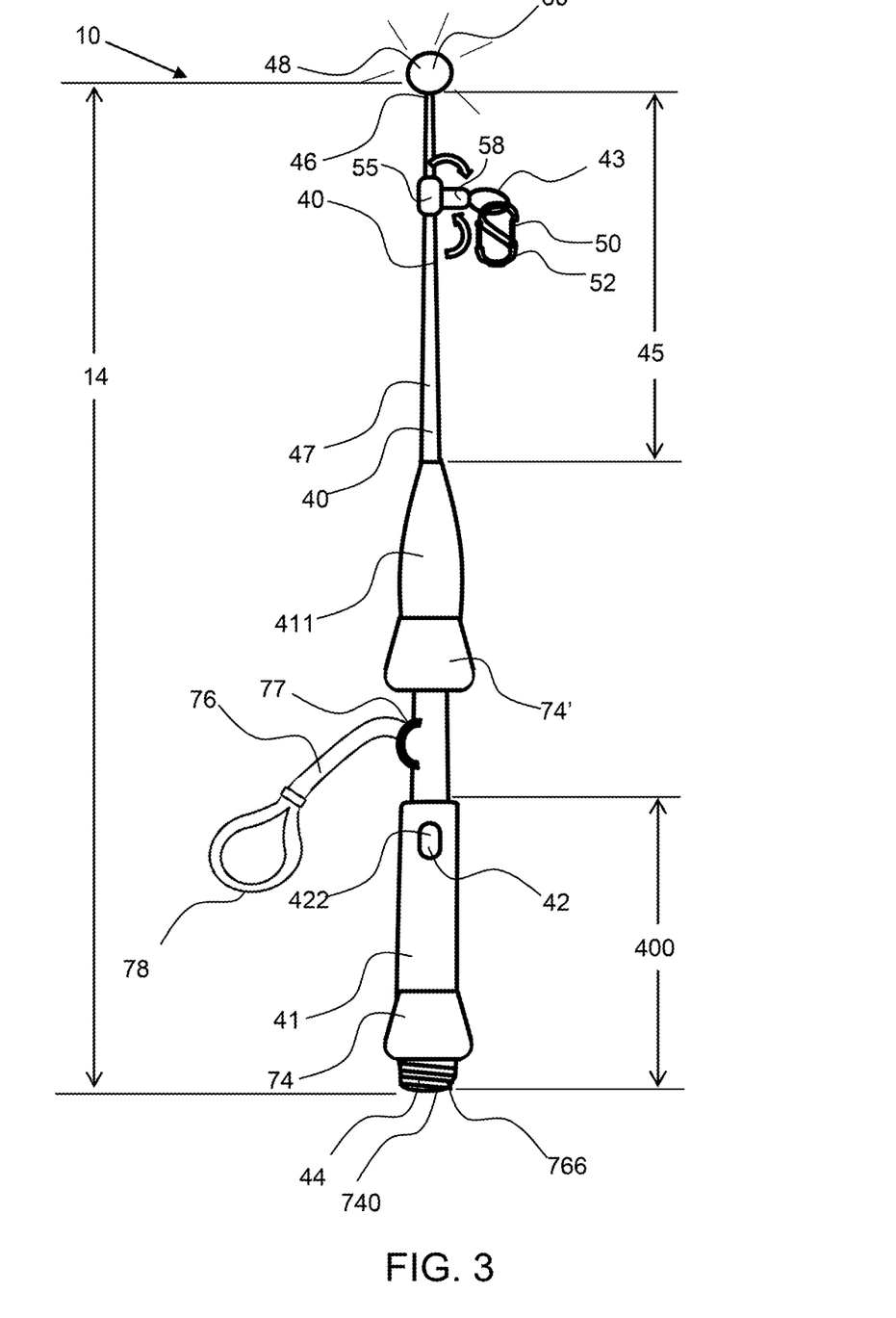
FIG. 3 shows a side view of a leash-pole of a leash-pole system.

Referring now to FIGS. 1 to 3, a leash-pole system 10 includes a leash-pole 40 with a flexible extension 47 between a user end 44 and an extended end 46. An attachment accessory 480, such as an end plug 48 is configured at the extended end 46 and may be a bulb or spherical shaped end plug. A light 60 is configured with, such as in or on the end plug 48 at the extended end 46 of the leash-pole 40. A battery 600 may be configured with the attachment accessory 480 or be coupled to the leash pole, such as battery 600' configured in the handle. A leash attachment portion 42, such as a leash attachment protrusion 422 is proximal to the user end 44. A handle 41 is configured between the user end 44 and the extended end 46. A strap attachment 77 such as a loop extending from the leash pole 44 may be configured proximal to the user end 44 of the handle. As shown, the strap attachment 77 is configured between the handle 41 proximal to the user end 44 and the extended handle 411 more proximal to the extended end 46 of the leash pole 40. A rear support 74, such as an enlarged portion of the handle 41 may be configured on the user end of the handle 41 and a rear support 74' may be configured on a user end, end most proximal to the user end 44 of the leash pole 40, of the extended handle 411. The rear supports 74, 74' may extend out radially from the handle 41, 411 respectively to prevent a person hand from sliding back off the end of the handle. A strap 76 may be detachably attached to the strap attachment 77 and may comprise a strap loop 78 configured to extend over a user's hand or wrist, as shown.

A flexible extension 47 extends along the handle 41 between the user end 44 and the extended end 46 of the leash-pole 40. The flexible extension 47 may extend from the handle 41 or extended handle 411 to the extended end 46. The flexible extension may be tapered towards the extended end 46 to enable more flexing of the flexible extension toward the extended end.

As shown in FIG. 1, a hand 70 of user/owner grips the extended handle 411 of the leash-pole 40 and may also simultaneously grip a portion of the leash 30 to provide some resistance to the leash being drawn out from the leash retractor 32. The leash extends along the flexible extension 47, through the latch leash guide 52, and to the collar 22 of the pet 20.

Figure 4:
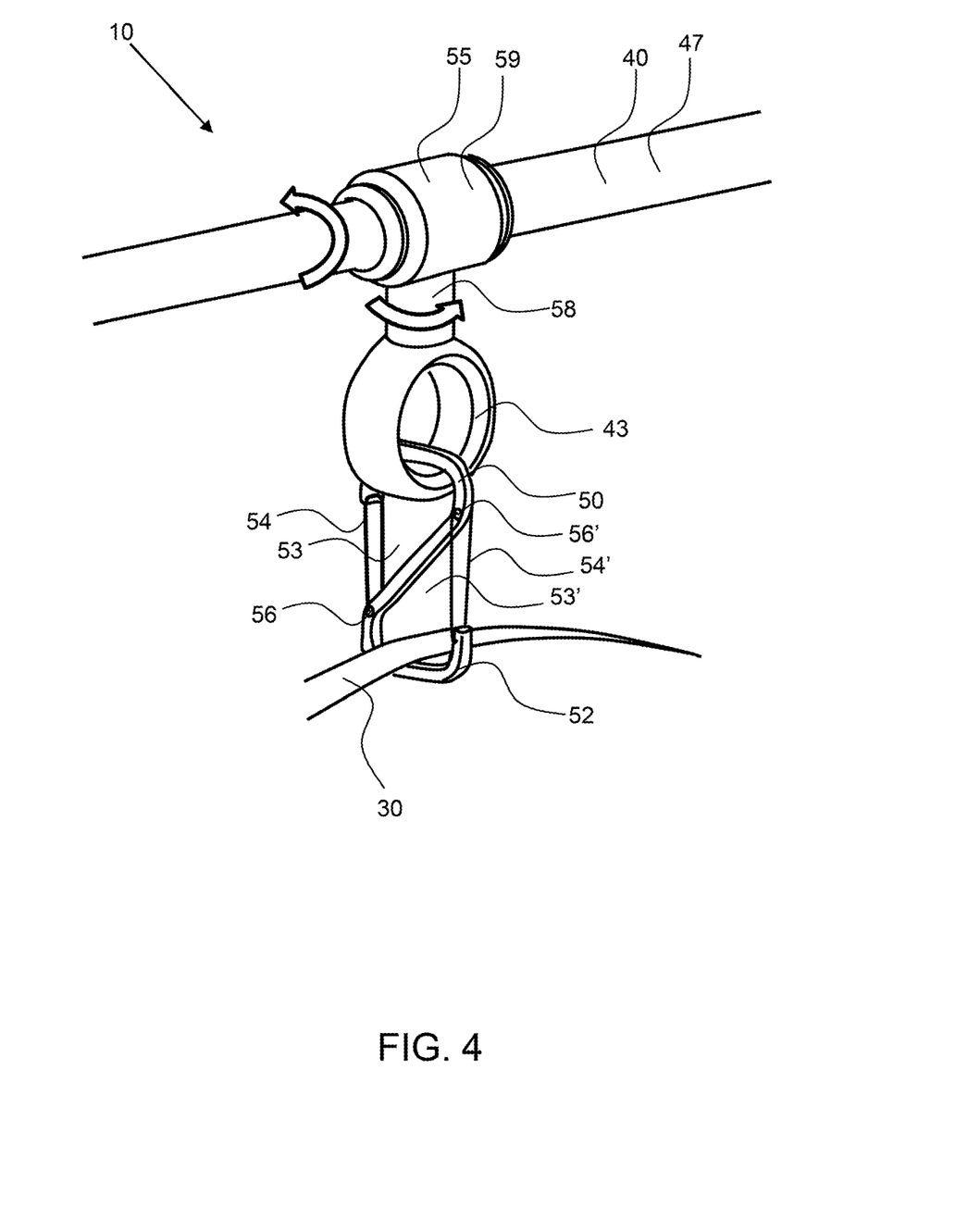
FIG. 4 shows a partial side view of a leash-pole system including the eyelet latch coupled to the eyelet latch swivel of the pole leash guide.
Figure 5:
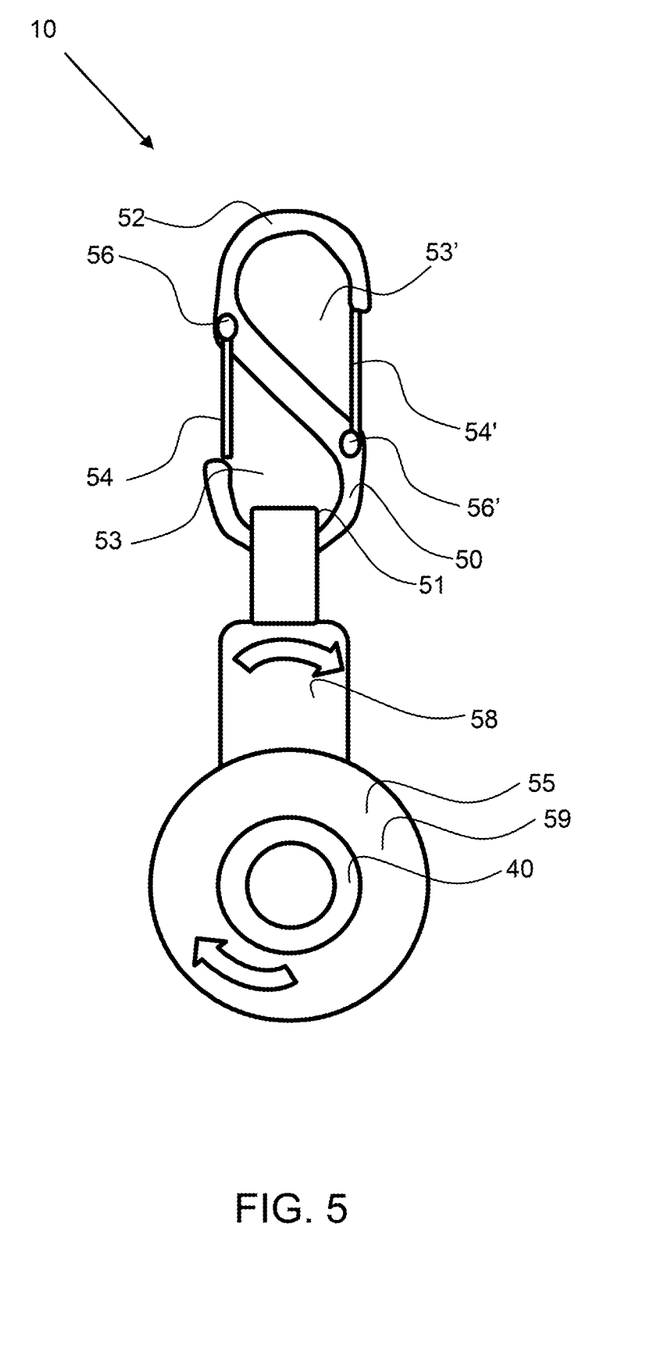
FIG. 5 shows a cross-sectional view of a pole leash guide coupled to the e.

With reference to FIGS. 4 and 5, an eyelet 43 is configured along the flexible extension 47 and may be coupled to the leash pole 40 by a pole leash guide 59 including an eyelet latch swivel 58 that is coupled to a pole swivel 55. The eyelet latch swivel 58 may be configured to rotate or swivel and the pole swivel 55 may be configured to rotate about the leash pole 40; as indicated by the bold curved arrows. These two orthogonal rotational directions of the eyelet latch swivel 58 and the pole swivel 55 enable the leash to move about the leash pole as the pet or dog moves from side to side. This may prevent high jerking forces on the leash pole. As best shown in FIG. 4, the leash 30 is guided by an eyelet latch 50, that may be detachably attachable to the eyelet 43 of the pole leash guide 59. The eyelet latch has an eyelet retainer 53 that extends around the eyelet 43 and is retained thereon by the eyelet latch arm 54, configured to open and close to enable the eyelet latch 50 to be detached from the eyelet 43. The eyelet latch also has an eyelet retainer 53' forming a latch leash guide 52 to guide and retain the leash 30 therethrough. The eyelet retainer 53' has an eyelet latch arm 54' that is configured to open and close to enable the leach 30 to be removed from the eyelet latch 50. The eyelet latch arm 54 opens by pivoting about the eyelet latch hinge 56 and the eyelet latch arm 54' opens by pivoting about the eyelet latch hinge 56'.

Referring back now to FIGS. 1 to 3, and as best shown in FIG. 2, leash retractor 32 is detachably attachable to the leash pole 40 by a leash attachment 80, such as a flexible band 82 that extends around the leash pole 40 and is secured by the leash attachment portion 42 of the leash pole 40, such as a leash attachment protrusion 422. The flexible band 82 may be wrapped around the leash pole 40 and retained by looping the flexible band over the leash attachment protrusion. The leash retractor may have a leash release lock 34 to prevent the leash retractor from retracting the leash 30 into the leash retractor 32. The owner end 36 of the leash 30 is configured with the leash retractor 32 and the pet end 37 of the leash is coupled to a pet collar 22 on a pet 20, such as a dog, as shown in FIG. 1. A leash retractor 32 is removably attached to the leash attachment portion 42 of the leash-pole 40 by the leash attachment 80, which is shown as a flexible band 82 in FIG. 1. The leash attachment 80 forms a first loop 84 and a second loop 86 around the leash attachment portion 42 of the leash-pole 40 and the leash attachment extends through the aperture 38 of the leash retractor 32. Note that the leash attachment may extend around a portion of the leash retractor to couple the leash retractor to the leash-pole 40. The leash 30 extends from the leash retractor 32, with an owner end 36 of the leash 30 being connected to the leash retractor 32 to the pet end 37 of the leash 30, coupled with a collar 22 of a pet 20.

As shown in FIG. 3, the handle 41 has a length 400 and the flexible extension 47 has a length 45. The length 400 of the handle 41 and/or the extended handle 411 may be about 100 cm or more, about 150 cm or more, about 200 cm or more, about 250 cm or more and any range between and including the length values provided. The length of the handle 41 and/or the extended handle 411 may be long enough to enable a person's hand to fit comfortably about the handle. The flexible extension may have a length 45 of about 0.5 m or more, about 0.6 m or more, about 0.75 m or more, about 1.0 m or more, or may be about 1.5 m or less or even 1.0 m or less and any range between and including the length values provided. The flexible extension or length of the leash pole from the extended handle or handle to the extended end 46 may be long enough to enable guiding the pet but not so long that it is cumbersome. The length 14 of the entire leash-pole system 10 from the user end 44 of the leash pole 40 to the extended end 46 of the leash pole 46 may be about 0.5 m or more, about 1.0 m or more, about 1.5 m or more and may be about 2.0 m or less or even 1.5 m or less. The ratio of the length 45 of the flexible extension 47 to the length 14 of the entire leash-pole system may be about 0.5 or more, about 0.75 or more, about 0.85 or more and any range between and including the values provided.

Figure 6:
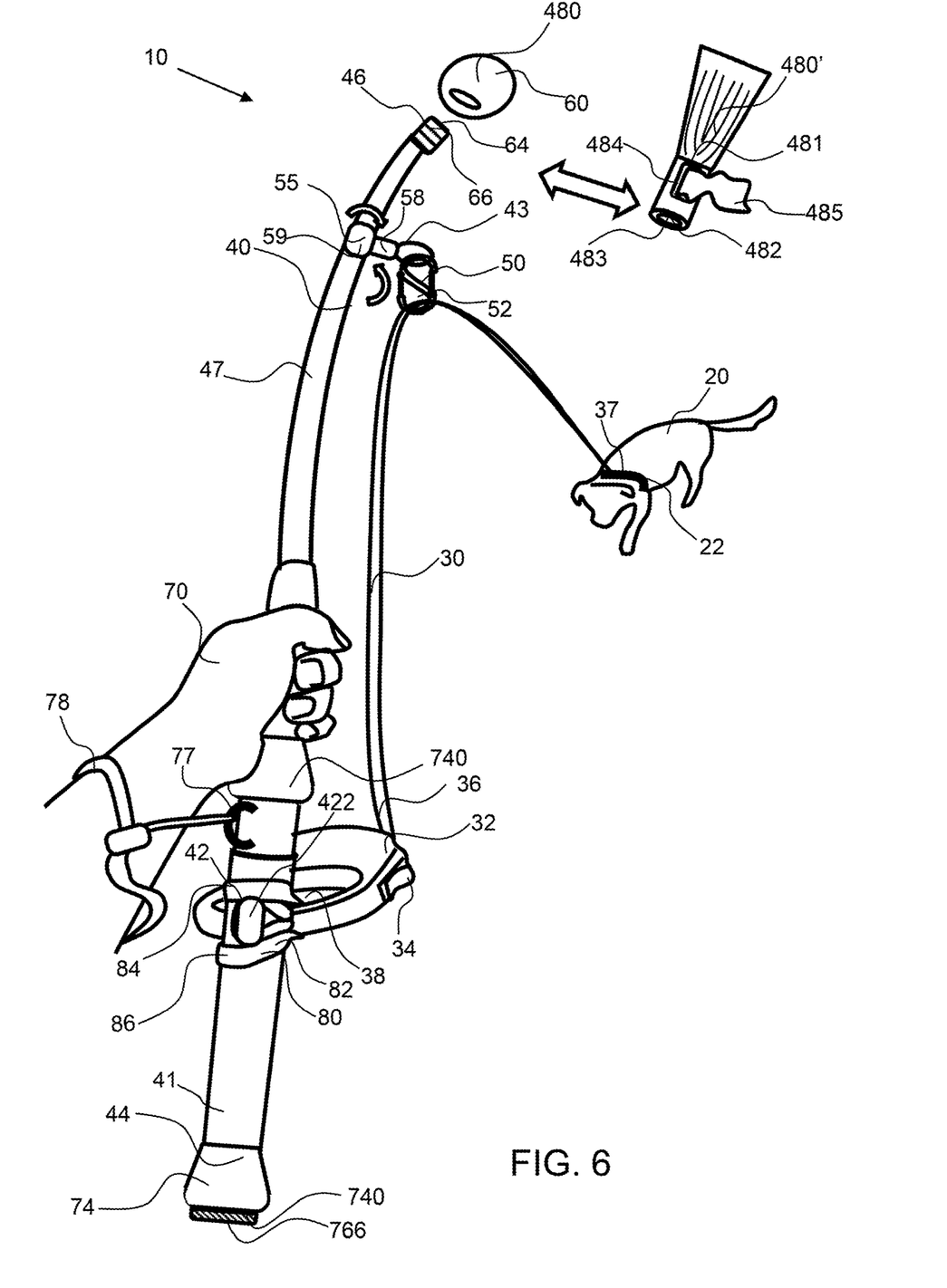
FIG. 6 shows a perspective view of the leash-pole system with a light detached from the end attachment feature, threads on the extended end of the leash pole.

The pole leash guide 59 may be configured more proximal to the extended end 46 than the user end 44 of the leash pole 40 to allow force from the leash to flex the leash pole 40. The pole leash guide 59 may be configured about 65% of the length of the leash pole toward the extended end, or about 75% or even 90% of the length of the leash pole toward the extended end 46. The pole leash guide 59 may be configured on the extended end 46. The pole leash guide 59 may be configured away from the extended end as the extended end may have an accessory attachment as shown in FIG. 6 and the pole leash guide may interfere with the accessory if configured too close to the extended end. Also, the flexible extension may flex too much with the pole leash guide configured on or just proximal to the extended end.

As shown in FIG. 6, an attachment accessory 480 may be configured on the extended end 46 of the leash pole 40 and may be detachably attachable by an end attachment feature 64, such as threads 66. The attachment accessory 480 may have a threaded feature configured to thread onto the end attachment feature 64 of the leash pole 40. The attachment accessory may be a ball, or toy for the pet to play with and may include a light 60 to help illuminate a path as a person walks their pet in low light conditions, such as at night. An attachment accessory 480' may be a pooper-scooper 481 having an attachment feature 482, such as threads 483 to detachably attach the pooper-scooper to the end attachment feature 64, such as threads 66 or to the handle attachment 740, such as threads 766. The pooper-scooper may enable a pet owner to conveniently pick up feces and place it in trash can. The attachment accessory 480' may also include a receptacle 484 for poop-bags 485 and this receptacle may be configured with or separately from the pooper-scooper 481, thereby providing options for the pet owner for picking up and disposing of pet feces.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A leash-pole system comprising:
   a) a leash-pole comprising:
      i) a user end;
      ii) an extended end;
      iii) a handle configured proximal to the user end;
      iv) a leash attachment protrusion extending from the leash pole;
      v) a flexible extension extending a length from the handle to the extended end;
      where the flexible extension is configured to bend to a radius of curvature of 0.5 m without breaking; and
      wherein the flexible extension tapers from the user end to the extended end;
   b) a pole leash guide coupled to the leash-pole and comprising:
      i) an eyelet;
      ii) an eyelet latch swivel configured to enable the eyelet to swivel orthogonal to the leash-pole axis; and
      iii) a pole swivel configured to enable the eyelet to swivel around the leash-pole;
   c) an eyelet latch comprising:
      i) eyelet retainer;
      ii) latch leash guide;
   d) a leash attachment detachably attached to the leash attachment protrusion and wherein the leash attachment consists of a flexible band that is wrapped around the leash pole and looped around the leash attachment protrusion;
   e) a leash extending from an owner end to a pet end and detachably attached to the leash attachment protrusion of the leash-pole by the leash attachment;
      wherein the eyelet latch is detachably attachable to the eyelet of the pole leash guide;
      wherein the eyelet retainer comprises an eyelet latch arm configured to open to detachably attach the eyelet retainer to the eyelet, and wherein the latch leash guide comprises an eyelet latch arm configured to open detachably attach the leash from the latch leash guide; and
      wherein in use, the leash extends from the owner end, through the latch leash guide and then to a collar coupled to a pet.

2. The leash-pole system of claim 1, wherein the leash pole further comprises a first eyelet and a second eyelet, wherein the first eyelet is configured closer to the user end than the second eyelet.

3. The leash-pole system of claim 1, wherein the length of the flexible extension is 1.5 meters or less.

4. The leash-pole system of claim 1, wherein the pole leash guide comprises an eyelet to detachably couple the leash thereto.

5. The leash-pole system of claim 1, further comprising an attachment accessory coupled to the extended end of the leash pole.

6. The leash-pole system of claim 5, wherein the leash pole comprises an end attachment feature and wherein the attachment accessory is detachably attachable to the extended end of the leash pole by said end attachment feature.

7. The leash-pole system of claim 1, further comprising an attachment accessory coupled to the extended end of the leash pole and wherein the attachment accessory further comprising a light.

8. The leash-pole system of claim 1, further comprising an attachment accessory coupled to the extended end of the leash pole and wherein the attachment accessory is wider than the extended end of the flexible extension by a factor of at least three.

* * * * *